Patented Jan. 23, 1940

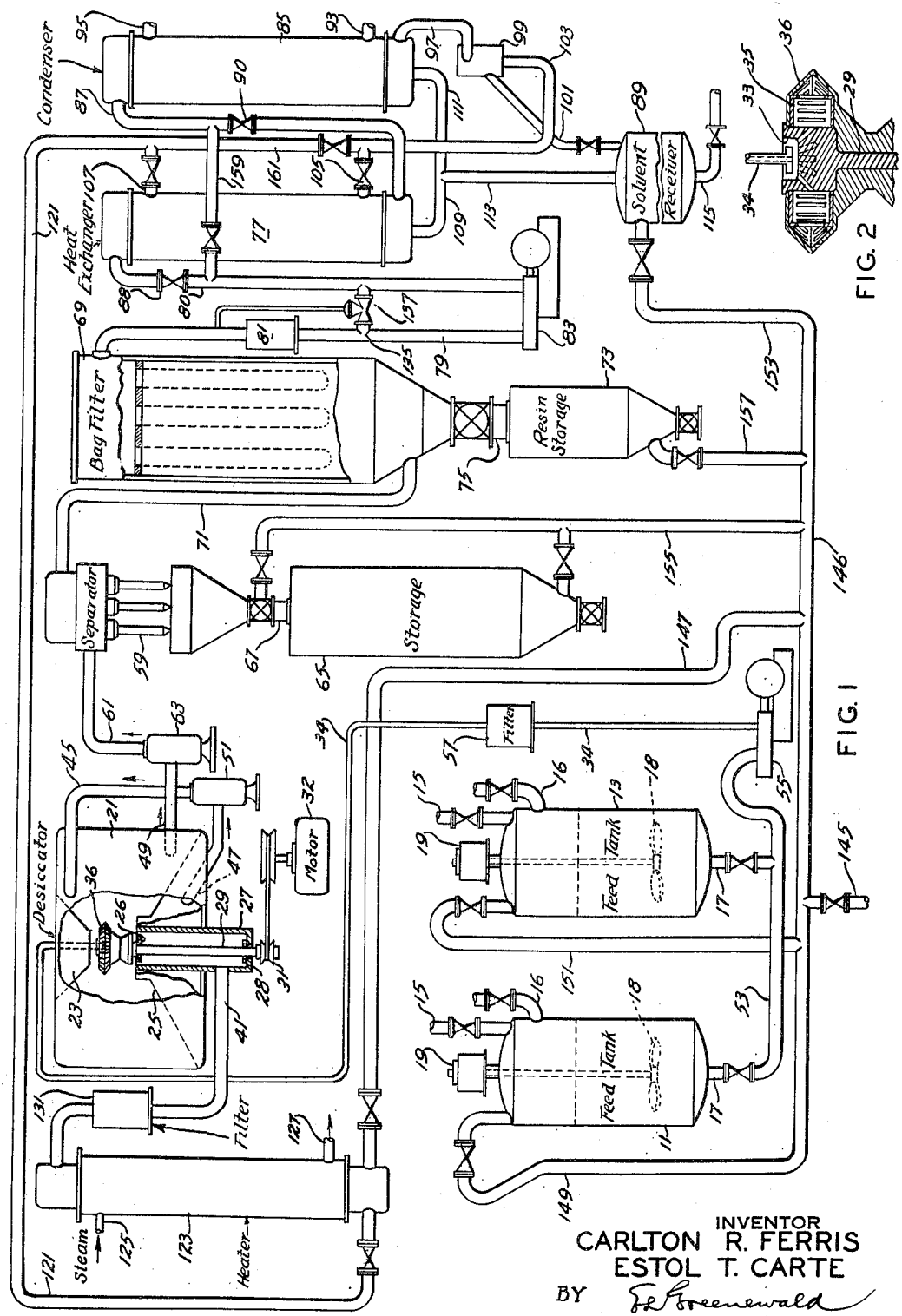

2,187,877

UNITED STATES PATENT OFFICE 2,187,877

PROCESS FOR SPRAY DRYING THERMO-
PLASTIC RESINS

Carlton R. Ferris, Charleston, and Estol T. Carte,
South Charleston, W. Va., assignors to Carbide
and Carbon Chemicals Corporation, a corporation of New York Application June 19, 1936, Serial No. 86,211

11 Claims. (Cl. 260—85)

This invention relates to the precipitation and and drying of thermoplastic, heat-sensitive materials; and more especially it concerns a process and apparatus for the spray precipitation and drying in finely-divided form, of heat-sensitive resins from solutions thereof in one or more volatile solvents, with the concurrent recovery of the solvents in liquid form in substantially the same amounts introduced with the feed solution. The invention has especial utility in the continuous precipitation and drying of thermoplastic resins such as vinyl resins, styrol resins, and similar resinous materials.

In processes for vinyl resin production now in use it is customary to remove from the reaction mixture containing the polymerized resins unreacted vinyl chloride, after which the vinyl resin is precipitated from the residual solution which also contains acetone, vinyl acetate, residual catalyst, and some acetic and benzoic acids. The precipitation is effected by intimately mixing with the said solution a mixture of acetone and water which is added slowly thereto. The mixture is then allowed to settle, and the resin precipitates, after which the clear liquid is decanted off. The resin is then washed with water to remove the last traces of acetone and vinyl acetate.

The foregoing procedure is not applicable in the case of vinyl resins produced from monomeric vinyl compounds containing less than around 84% of vinyl chloride. Therefore many resins required in the manufacture of certain vinyl lacquers, safety laminated glass, and molding compounds, when precipitated with water, form a large sticky mass rather than a granular powder, due to the increased concentration of vinyl acetate in the resin molecule. It is often difficult to remove from such a mass the last of the solvents and water and to secure a product free from impurities. Moreover, it is often difficult if not impossible to recover the solvents originally present in the resin solution.

The present invention is based in important part upon the discovery that by the utilization of a closed or cyclic system which includes a spray dryer and wherein the system is operated under a low positive pressure in the presence of an inert fluid, which may be or may contain one or more of the reactants forming the heat-sensitive, thermoplastic material being dried, it is possible continuously and effectively to precipitate and dry such material from solutions thereof at a rapid rate without injury thereto, while preventing the material from reaching a temperature near or above its softening point. The solvents and any residual reactants present in the solutions concurrently are recovered in the process.

Among the more important objects of the invention are: to provide in novel manner for precipitating and/or drying heat-sensitive, thermoplastic materials; to provide for precipitating and drying thermoplastic resins while maintaining them in finely-divided form; to provide in novel manner for drying thermoplastic resins at temperatures below their softening points; to provide in novel manner for separating resin particles from solvent vapors while maintaining the solvent above its dew point; to provide for continuously producing a heat-sensitive thermoplastic resin in finely-divided form from a solution thereof, and the concurrent recovery of volatile solvents and unreacted compounds present in the said solution; and to provide a spray-drying and solvent recovery system utilizing as both a heating and carrying agency for the materials being dried, a fluid containing liquid constituents of the solution being treated.

These and other objects will be manifest from the following description.

According to the present invention, a solution of the material to be spray-dried is fed, either continuously or intermittently, to an atomizing member within a disiccator wherein atomization of the solution is effected in a swirling blast of hot recirculated inert gases flowing through the desiccator and having an inlet temperature of around 180° C. or below. While a concentrated solution of the thermoplastic material may be utilized, the solution may first be diluted with a suitable solvent for the said material, in order to assist in preventing unduly high temperatures in the desiccator and subsequent steps. For example, in spray-drying vinyl resins it is preferred to dilute the usual autoclave product to a "total solids" content of around 12%. If a solution containing around 33% of vinyl resin is fed to the desiccator operating at atmospheric pressure, the suspension of resin in the vapors leaving the latter may have a temperature of around 121° C. It is desired to keep the temperature much lower, in order to prolong the life of the bag filters, and to economize heat.

Generally the desiccator is maintained at a low superatmospheric pressure, for example, around one pound per square inch gauge. The hot gases evaporate the solvents from the atomized droplets, producing a dry powder containing up to 3 or 4% of solvents, which powder is separated from the fluid stream at a temperature at which none of the vapors condense. The fluid stream then is pumped through a condensing system preferably maintained under low superatmospheric pressure, where the fluids are cooled to a temperature below the boiling points of the condensable ingredients, and the thus condensed liquids are recovered. If desired, such liquids then may be separated from each other, as by fractional distillation.

The cold stripped gases then are fed directly to a gas heater or, since they are at a low temperature,—often around —10° C. or below—they may be utilized in a first stage of the condenser system as the preliminary cooling medium for the stripped hot gases and vapors entering the cooling zone, after which the former flow to the gas heater. In this heater they are reheated to around 150° C. to 180° C., and are then delivered to the desiccator for reuse.

In one modification of the invention the solution to be dried is projected from the periphery of a rapidly revolving disc or wheel by centrifugal action, thus causing it to be atomized into the path of flow of a stream of a hot inert gas or gas mixture maintained in a closed circulatory system that includes the desiccator. As inert gases for heating the liquid and for carrying the finely-divided particles of the dried product to apparatus for recovering the latter, there may be employed nitrogen, hydrogen, methane, hydrogen-methane mixtures, flue gases, vinyl chloride, superheated acetone vapors, air, and mixtures of these and similar fluids. Nitrogen is particularly efficacious for the purpose.

In the accompanying drawing, Fig. 1 illustrates somewhat diagrammatically one form of apparatus embodying the invention; and Fig. 2 is a vertical section through a fragment of one form of atomizing assembly, parts being broken away.

Referring to the drawing, numerals 11 and 13 designate mixing and feeding tanks for the solution in a volatile solvent of the thermoplastic material to be dried, in which tanks additional solvent may be added for adjusting the viscosity of the solution. Each of the tanks 11, 13, is provided with a valve-controlled inlet 15 for the said solution, a valve-controlled inlet 16 for the solvent, a valve-controlled outlet 17, and an agitator 18 driven by a motor 19.

For volatilizing the solvent from the solution of thermoplastic material while converting the dissolved material into finely-divided solid form there is provided, in the embodiment illustrated, a desiccator assembly comprising a closed shell 21 having an inverted cone-shaped deflecting member 23 secured to the top member and extending downwardly therefrom; and having a hollow conical deflecting member 25 formed centrally of and extending upwardly from the shell bottom. Extending vertically through the shell bottom and through the central opening in the upper end of the member 25, and rotatably mounted on bearings 26, 28, carried respectively upon the upper and lower ends of a conduit 27 extending through the shell bottom, is a shaft 29 driven by means of a pulley 31 connected through a belt with a pulley mounted on the drive shaft of a motor 32.

Secured upon the upper end of shaft 29 is a multiple centrifugal atomizer assembly, including a hollow cone or hub 33 surrounded by an inner runner 35 having closely spaced vertical slots in its periphery, which runner in turn is surrounded by a bowl-shaped atomizing member 36 having similar milled slots in its outer periphery. The parts 33, 35, 36, are secured together for rotation as a unit.

For delivering to the assembly the liquid to be atomized, a conduit 34 extends through the desiccator top and has its lower end in communication with the hollow cone. Atomization is accomplished by centrifugal force. The liquid feeds into the cone and thence into the inside of the member 35. It then is distributed to and through the outer milled slots of the member 36. The liquid then instantly is atomized within the shell 21 in a flowing atmosphere of heated inert gases, which are introduced through a conduit 41 connected with conduit 27. Hot gases from conduit 41 flow upwardly through the atomizer assembly and intermingle with the fluid leaving the latter. The atomized fluid quickly flashes through the inner high temperature zone adjacent the member 36 where most of the solvent is removed. As the material becomes a solid it passes into the outer low temperature zone where the drying is concluded at a temperature sufficiently low to prevent injury to the finely-divided thermoplastic heat-sensitive material. The latter quickly is swept from the desiccator within the stream of hot gases which have had their temperature suitably reduced by evaporation of the volatile portions of the solution.

For providing a high circulatory gas velocity in the desiccator so that the solid particles leaving the atomizer have a long spiral path of travel before contacting with the desiccator walls, there is provided a conduit 45 having an inlet 47 tangentially connected with the lower portion of the desiccator wall, and having an outlet tangentially connected with the upper portion of the said wall. The conduit has therein a motor-driven circulation fan or blower 51.

In order to supply to the desiccator the solution of the material to be dried, the feed conduit 34 is connected with the outlet of a feed pump 55, the inlet to which is connected by conduit 53 with the outlets 17, 17, of the tanks 11, 13. The feed pump 55 preferably is constructed of a corrosion-resistant metal or alloy, such as stainless steel. Conduit 34 has therein a closed strainer 57 comprising a screen, preferably constructed of aluminum or of stainless steel, adapted for removing any solids present in the resin solution flowing to the desiccator.

For separating the finely-divided solid material from the fluids in which it is suspended as it leaves the desiccator, there are provided one or more separators 59, preferably of the multiclone type, having tangentially-disposed inlets, the separators being arranged either in parallel or in series. For simplicity, only one separator is shown. The inlet of the first separator is connected with the desiccator through conduit 61 having therein a fan or blower 63; the latter has its inlet 49 tangentially connected with the lower portion of the desiccator side wall. The lower end of each separator is connected with a corresponding storage bin 65 for solid material, by means of a valve-controlled conduit 67.

For recovering from the vapors finely-divided solid particles not entrapped in the separator, there are provided one or more bag filters 69 of well known design, connected at their lower ends with the outlet from the separators 59 by means of conduit 71. Each bag filter has its lower end connected with a storage bin 73 by means of a valve-controlled conduit 75. Each bag filter unit periodically may be taken off the line and the bags shaken, whereupon the solids fall into or are fed to the bin 73. By the use of rotary valves in the lines 67 and 75, the solids deposited in the separator and bag filter may be fed continuously to the storage bins.

For condensing and recovering the solvent vapors and other condensable vapors present in the fluid stream, using the form of apparatus illustrated, an indirect heat exchanger 77 has its inlet connected with the vapor outlet from the bag filter by means of conduit 79, compressor 83, and conduit 80. Conduit 79 has therein a closed filter 81 containing glass wool or the like which serves to remove any solids passing through the bag filter. The compressor serves to compress the dust-free vapors to around five to ten pounds per square inch gauge, to overcome the pressure drop through the system.

The fluid outlet from the heat exchanger 77 is connected with the vapor inlet of a refrigerating condenser 85 by means of a conduit 87; and is connected with a solvent receiver 89 by means of conduits 109 and 113. A refrigerating medium such as brine is fed to the condenser 85 through an inlet 93, and is withdrawn through an outlet 95.

The condensate and gas mixture flow from the condenser 85 through conduit 97 to a liquid-gas separator 99, from which the liquid then flows through valve-controlled conduit 101 to the solvent receiver 89. The cold gases leave the separator 99 through conduit 103, and serve as the cooling medium in the heat exchanger 77, entering the latter at the valve-controlled inlet 105, and leaving through the valve-controlled outlet 107.

Any liquid condensed in the heat exchanger 77 and condenser 85 flows to the solvent receiver 89 through the respective lines 109, 111, 113. From the receiver 89 the liquid may be fed through valve-controlled conduit 115 to storage or to a still for separation and recovery of the various components.

The inert gases leaving the heat exchanger through line 107 flow to and through conduit 121 to a jacketed cycle-gas heater 123 wherein the gases are reheated with high pressure fluid entering the jacket through conduit 125 and leaving through conduit 127. Conduit 41, having therein a filter vessel 131 containing glass wool or the like, conducts the hot gases from the heater to the conduit 27, from whence the filtered hot gases enter the desiccator atomizing zone.

For the purpose of maintaining at all times a low positive pressure in the inlet line to the compressor 83, there is provided a short conduit 135 connecting the conduit 80 with the conduit 79 at a point in the latter between the outlet of filter 81 and the pump 83. The conduit 135 has therein a vacuum release valve 137 controlled by a diaphragm responsive to fluid pressure variations in line 79 ahead of the filter.

Nitrogen or other inert gas to be used as the cycle heating gas is fed to the heater through the headers 145, 146, and valve-controlled branch line 147. For insuring the maintenance of an atmosphere of inert gases within the tanks 11, 13, 89, and the storage bins 65 and 73, and for maintaining uniform pressure conditions throughout the system, the header 146 is provided with the valve-controlled branch lines 149, 151, 153, 155 and 157.

For the purpose of cutting out the heat exchanger 77 from the system when this is desired, a valve-controlled line 159 connects the conduit 80 directly with the line 87; and the lines 80 and 87 have the valves 88, 90 therein. Likewise, a valve-controlled conduit 161 connects conduit 103 directly with the conduit 121 leading to the heater.

The heat exchanger 77 may be used in association with other heat exchange media such as flowing water in well known manner.

The invention will now be illustrated in connection with a process for spray-drying a solution of a vinyl resin in acetone which solution contains unreacted vinyl chloride and vinyl acetate. Such a vinyl resin may be produced by the polymerization of a vinyl compound, such as a vinyl halide or a vinyl ester of an organic acid; or by the conjoint polymerization of mixtures of such compounds,—as, for example, a mixture containing around 80% of vinyl chloride and around 20% of vinyl acetate,—in the presence of a resin solvent such as acetone, and of a catalyst such as benzoyl peroxide, as described in U. S. Patent 2,011,132 of Young et al., issued August 13, 1935. The autoclave product containing vinyl resin, and unreacted vinyl chloride and vinyl acetate, and sufficient acetone to give a solution containing around 12% of vinyl resin, around 8.5% of vinyl chloride, around 4.5% of vinyl acetate and around 75% of acetone, is forced by the pump 55 through the filter 57 and into the atomizer assembly of the desiccator. The atomized liquid particles leaving the atomizer at high velocities flash through a narrow zone of cycle gases heated to temperatures around 150° C. As the finely-divided solid particles of heat-sensitive thermoplastic resin are formed by evaporation of the solvent, the former enter the outer relatively low-temperature zone where drying of the resin is concluded at a temperature sufficiently low to prevent injury thereto. Powdered resin cannot reenter the inner high temperature zone because of the centrifugal action exerted thereon due to rotation of the gases in the outer zone. A portion of the gases and suspended solids are recycled through the conduit 45 to facilitate intimate mixture of the sprayed solution and the hot gases. The hot cycle gases flowing to the desiccator in certain instances may contain around 91% of nitrogen, around 5.9% of vinyl chloride, and around 3.1% of acetone, all by volume.

The suspension of resin leaves the desiccator under a pressure slightly above atmospheric pressure and at a temperature around 50° C., and enters the separator 59, where a portion of the resin powder is deposited and may be withdrawn through the bin 65. The remaining resin suspension flows to the bag filter where the last of the resin is deposited; while the cycle gases pass through the filter bags. Periodically the bags are shaken, and the resin falling therefrom is withdrawn to the storage bin 73.

The gases leaving the bag filter may contain around 84.4% of nitrogen, around 9.2% of acetone, around 6.2% of vinyl chloride, and around 0.2% of vinyl acetate, all by volume.

These gases flow to the compressor 83 at a temperature around 45° C. and under a pressure of around 0.5 pound per square inch gauge, where a pressure of about 5 pounds per square inch gauge is imparted to the gases, the resultant compression of the gases heating the latter to about 75° C. The gases then flow through the heat exchanger 77, and then through the refrigerating or brine condenser 85. The acetone, vinyl chloride and vinyl acetate thus condensed flow to the solvent receiver through conduits 109, 111, 113.

The vapors leaving the heat exchanger enter the brine condenser at a temperature of about 9° C.; and the residual gases and vapors subsequently leave this condenser at a temperature of around −10° C. They then flow to the separator 99, from which any condensed liquid flows to the receiver 89 through conduit 101. The stripped inert gases, at a temperature of about −5° C., and under around 1.5 atmospheres pressure, then flow through the heat exchanger where they function as the cooling medium for vapors passing therethrough from the compressor. When the various elements of the system are operated under the conditions recited supra these stripped gases contain around 91% nitrogen, around 3.1% of acetone, and around 5.9% of vinyl chloride, all by volume. The condensate in the solvent receiver contains around 85.7% of acetone, around 9.6% of vinyl chloride, and around 4.7% of vinyl acetate, all by weight. The stripped gases leaving the heat exchanger and flowing to the heater 123 are at a temperature of around 70° C. In the heater they again are heated to form around 150° to 180° C., and are then filtered in vessel 131 prior to recycling them in the process.

The vinyl resin separated in the multi-clone separators and bag filters is in finely-divided or powder form, and has a resin content of 96 to 98% or higher.

The nitrogen utilized in the example herein cited may be replaced by other inert gases or vapors, such as hydrogen, hydrogen methane mixtures, and vinyl chloride vapors.

The solvents and reactants present in the solution being spray-dried may be separated and recovered in other manners besides that described supra. Thus the mixed gases and vapors may be cooled and the vapors condensed in a condensing system maintained under a pressure substantially above atmospheric, preferably around 25 to 60 pounds per square inch gauge pressure. By condensing the vapors under these superatmospheric pressures the use of refrigerating apparatus for providing a low temperature condensing medium can be eliminated.

When utilizing this modification of the invention, the apparatus described supra may be used, excepting that a single heat-exchanger, which may be water-cooled, is substituted for the heat-exchanger 77 and condenser 85. Conduit 80 leads into the heat-exchanger; and the outlet from the latter is directly connected with the receiver 89, the upper end of which is connected with the inlet of the heater 123 by means of a conduit having therein a suitable pressure-reducing valve (not shown). A pressure-controlling valve also is placed in the conduit 79 leading to the compressor 83, to prevent back-pressure in the bag filters 69.

The following will serve to illustrate the modification of the process involving recovery of the solvent by condensation of the vapors under pressure:

A vinyl resin reaction mixture produced by the conjoint polymerization of a mixture of vinyl chloride and vinyl acetate in acetone, and containing around 24% by weight of the resin, is diluted with acetone to a 12% resin content. The diluted mixture is fed to the desiccator 21 where it is atomized in the presence of a blast of hot recirculated inert gases of the type hereinbefore described having a temperature within the range from around 150° to around 180° C., and flowing under a pressure of around one pound per square inch gauge. The resultant dry powder having 96 to 98% total solids content is separated from the vapors and gas in the manner already described. The gas and vapors leaving the bag filter at a temperature around 50° C. are compressed by compressor 83 to a selected pressure in the range from around 25 to around 60 pounds per square inch gauge, thus substantially increasing the temperature of the fluid. This temperature then is reduced in the condenser.

The condensate and gases leave the condenser at around 35° C.,—the former flowing to the receiver 89, and containing around 86% by weight of acetone, around 10% by weight of vinyl chloride, and around 4% by weight of vinyl acetate. The stripped gases leaving the condenser for the heater,—when using a pressure of 60 pounds per square inch gauge, and nitrogen as the inert gas,—contain approximately 83 mol % of nitrogen, 9 mol % of vinyl chloride, and 8 mol % of acetone. These gases are expanded to a pressure of around one pound per square inch gauge before entering the heater.

The utilization of a substantial pressure differential between the condensing zone and the remainder of the system facilitates condensation of the vinyl chloride and other vapors in the condenser without the necessity of using extreme cooling or refrigeration. There thus is very little tendency for the vapors to liquefy in the portion of the system where a dry powder must be separated from them. This is particularly important in instances where vinyl chloride or similar vapor is used as the heat-carrying medium.

It is within the scope of the invention to remove free vinyl chloride from the acetone solution of vinyl resin by suitable heat treatment before the latter is fed to the desiccator.

Furthermore it is possible,—especially in instances where a cyclic system is not desired,—to recover the solvents from a mixture of vapors and gases leaving the bag filter by a scrubbing operation. The fluid mixture can be scrubbed with acetone to remove the vinyl chloride, and then with water to recover the acetone. This necessarily involves the use of elaborate and expensive scrubbing equipment, and even more expensive equipment for the recovery in pure state of the valuable solvents.

The invention is susceptible of modification within the scope of the appended claims.

We claim:

1. Continuous process for producing a thermoplastic heat-sensitive resin in finely-divided solid form, which comprises continuously atomizing a solution of the said resin in a volatile organic solvent in the presence of a recycled stream of hot inert gas free from solid impurities, thereby flashing the vaporizable components of said solution into vapor form while precipitating the resin in finely-divided solid form at a temperature below its softening point, separately recovering the solid resin, increasing the pressure upon the residual vapors and gas, stripping vapors of said solvent from the gas while the latter is under said increased pressure, reheating the residual gas containing vapors of said solvent, and recycling in the process said reheated gas free from solid impurities.

2. The cyclic process of precipitating and drying a thermoplastic heat-sensitive resin in finely-divided form, which comprises atomizing a solution of the said resin in a volatile organic solvent within an enclosed space while suspending the atomized particles in a flowing stream of heated inert gases, thereby flashing the solvent into vapor form and precipitating and drying the resin particles in finely-divided form at a temperature below the softening point of the resin, quickly removing to a cooler zone from the point of first contact of the atomized solution and hot gases the resin suspended in the inert gases before substantial injury of the resin particles occurs, separating the finely-divided resin from the stream of mixed vapors and gases, recovering the resin while maintaining the same under the influence of an inert gas, increasing the pressure upon the residual stream of vapors and gases, condensing and recovering at least a portion of the vaporous components of the said stream while under such increased pressure, reheating the residual gases containing vapors of said organic solvent, filtering the reheated gases, and atomizing a fresh portion of the said resin solution in a flowing stream of the reheated gases.

3. Process as defined in claim 2, wherein each of the steps is conducted under a low pressure not substantially below atmospheric pressure.

4. The cyclic process of precipitating and drying a thermoplastic heat-sensitive resin in substantially pure finely-divided solid form, which comprises filtering a solution of the said resin in a volatile organic solvent, thereby removing solid impurities, atomizing the filtered solution within an enclosed space and concurrently suspending the atomized solution in a flowing stream of heated inert gases that are free from solid impurities, thereby flashing the vaporizable components of the solution into vapor form while precipitating and drying the resin in finely-divided form at a temperature below the softening point of the resin, separating the finely-divided resin from the mixture of vapors and inert gases, increasing the pressure upon said mixture, condensing from the mixture at least a portion of said vapors, reducing the pressure on the residual vapors and gases, reheating the stripped inert gases containing vapors of said volatile solvent, filtering the reheated gases, and utilizing the filtered gases for suspending a fresh supply of the said atomized solution within the said enclosed space and for vaporizing therefrom the volatile components.

5. Process as defined in claim 4, according to which each of the various steps is conducted under a pressure slightly above atmospheric pressure.

6. Continuous process for producing a thermoplastic heat-sensitive resin in finely-divided solid form, which comprises atomizing a solution of the said resin in a volatile organic solvent in the presence of a flowing stream of hot inert gas, quickly precipitating and converting the said resin to finely-divided solid form while in suspension in the stream of hot inert gas, and while preventing the heating of the resin to its softening point, separating the solid resin from the residual fluid stream containing vapors of the said solvent, increasing the pressure on the residual fluid, cooling and condensing at least a portion of the condensable components of the latter, separating the condensed fluids from the remaining vapor-containing inert gas, thereafter reducing the pressure on the latter and passing the same in indirect heat-exchange relation with a fluid stream flowing from the first-named separation step to the said condensing step, thereafter reheating the stream of stripped inert gas, subjecting the last-named heated gas to a solids-separating step, and atomizing another portion of the said solution of resin within a flowing stream of the last-named reheated gas.

7. In a cyclic process for perparing a thermoplastic heat-sensitive vinyl resin in finely-divided solid form, the steps of repeatedly circulating a stream of an inert gas containing a polymerizable vinyl compound successively through a spraying and drying zone, a resin-separating zone, a vapor-condensing and recovery zone, and a gas-reheating zone, spraying into the hot inert gas in the spraying zone a liquid reaction mixture containing a vinyl resin and at least one volatile polymerizable vinyl compound in solution in a volatile organic solvent, said vinyl compound and said solvent being volatilized and entrained by said gas in the spraying zone, and said vinyl resin being converted into finely-divided solid form, separating the latter from the vapor-laden gas in said resin-separating zone, increasing the pressure upon the residual gas, condensing and recovering from the residual gas in said vapor-condensing zone at least a substantial portion of said vinyl compound and said solvent while under said increased pressure, reheating the thus-stripped inert gas containing the polymerizable vinyl compound and volatile solvent in said reheating zone, filtering the reheated gas while at a high temperature, and intimately contacting the resultant filtered hot gas with a spray of said liquid reaction mixture in said spraying zone.

8. Cyclic process for precipitating and drying a vinyl resin in finely-divided solid form, which comprises atomizing a solution of the said resin in a volatile solvent for the resin in an atomizing zone in the presence of a flowing stream of a highly-heated inert fluid containing small amounts of the vapors of the said solvent and of unreacted polymerizable vinyl compounds, quickly precipitating and drying the said vinyl resin in finely-divided form while concurrently cooling the particles to a temperature below the softening point of the resin, separating the resin particles from the fluid stream, condensing from the latter and recovering condensable vapors of the said solvent and unreacted vinyl compounds, reheating the residual fluid containing some resin solvent and unreacted vinyl compounds, and conducting the same to the said atomizing zone, each of the said steps being conducted under a low pressure at least as high as atmospheric pressure, and the steps of condensing and recovering said solvent and unreacted vinyl compounds being effected under a pressure substantially above the pressure maintained in the other steps of the process.

9. Cyclic process for precipitating and drying a vinyl resin in finely-divided solid form, which comprises atomizing a solution of the said resin in a volatile organic solvent for the resin in an atomizing zone in the presence of a flowing stream of a highly-heated inert fluid containing small amounts of the vapors of the said solvent and of unreacted polymerizable vinyl compounds, the said solution having a total solids content of around 12%, quickly precipitating and drying the said vinyl resin in finely-divided form while concurrently cooling the particles to a temperature below the softening point of the resin, separating the resin particles from the fluid stream, cooling the said fluid stream, condensing from the latter and recovering condensable vapors of the said solvent and unreacted vinyl compounds, reheating the residual fluid containing some resin solvent and unreacted vinyl compound, filtering the reheated fluid, and conducting the same to the said atomizing zone, the said steps of cooling and condensing the fluid stream and of recovering therefrom said condensable vapors being effected under a pressure substantially above the pressure maintained in the other steps of the process.

10. Cyclic process for precipitating and drying a vinyl resin in finely-divided solid form, which comprises atomizing a solution of said resin in a volatile organic solvent in an atomizing zone in the presence of a flowing stream of a highly-heated inert fluid containing small amounts of the vapors of the said solvent and of unreacted polymerizable vinyl compounds, quickly precipitating and drying the said vinyl resin in finely-divided form while concurrently cooling the resin particles to a temperature below the resin softening point, separating the resin particles from the fluid stream, increasing the pressure upon the latter and condensing therefrom and recovering at least a substantial portion of the condensable vapors of the said solvent and unreacted vinyl compounds, reducing the pressure upon the residual fluid containing some resin solvent and unreacted vinyl compounds, reheating the latter fluid, subjecting the same to a high temperature solids-separating step, and recycling the reheated fluid in the process.

11. Cyclic process for producing a vinyl resin in finely-divided solid form, which comprises atomizing a solution of the said resin in a volatile organic solvent in an atomizing zone in the presence of a flowing stream of a highly-heated inert fluid containing small amounts of the vapors of said solvent and of unreacted polymerizable vinyl compounds, quickly precipitating and drying the said vinyl resin in finely-divided form while concurrently cooling the particles to a temperature below the softening point of the resin and while suspending vapors of said solvent and vinyl compounds in the said fluid, separating the resin particles from the fluid stream, increasing the pressure on the latter and condensing therefrom and recovering a substantial portion of the condensable vapors of said solvent and vinyl compounds, reducing the pressure to around atmospheric, reheating the residual fluid containing some resin solvent and vinyl compounds, subjecting the reheated fluid to a solids-removing step, and conducting the resultant fluid to said atomizing zone, each of the said steps being conducted under a low pressure at least as high as atmospheric pressure.

CARLTON R. FERRIS.
ESTOL T. CARTE.